No. 822,360. PATENTED JUNE 5, 1906.
R. F. GILCHRIST.
BEET RACK.
APPLICATION FILED JUNE 22, 1905.
2 SHEETS—SHEET 1.
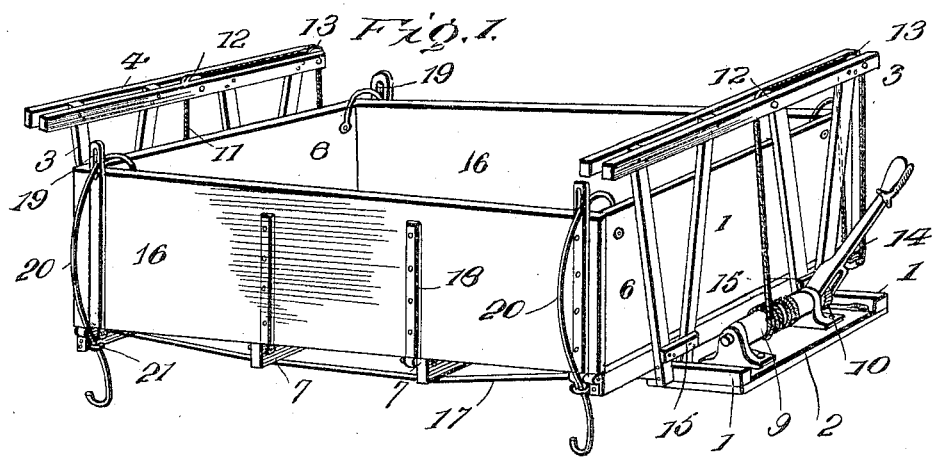
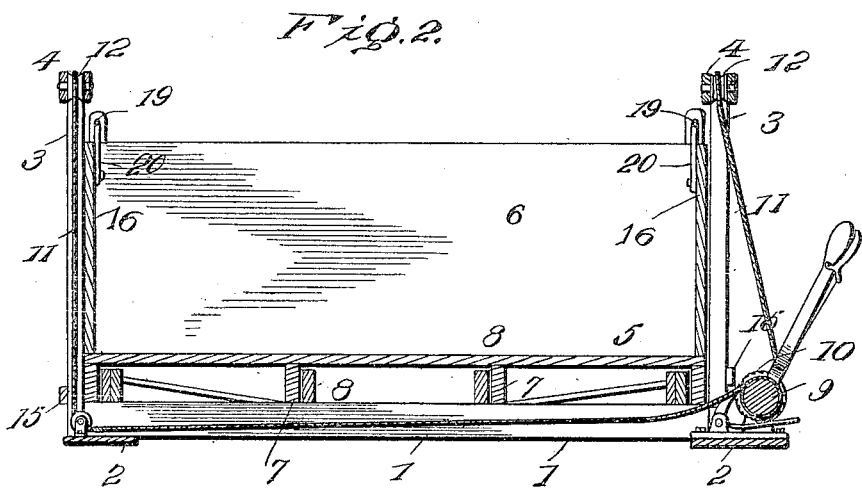
Witnesses
Inventor
R. F. Gilchrist,
By
Attorneys

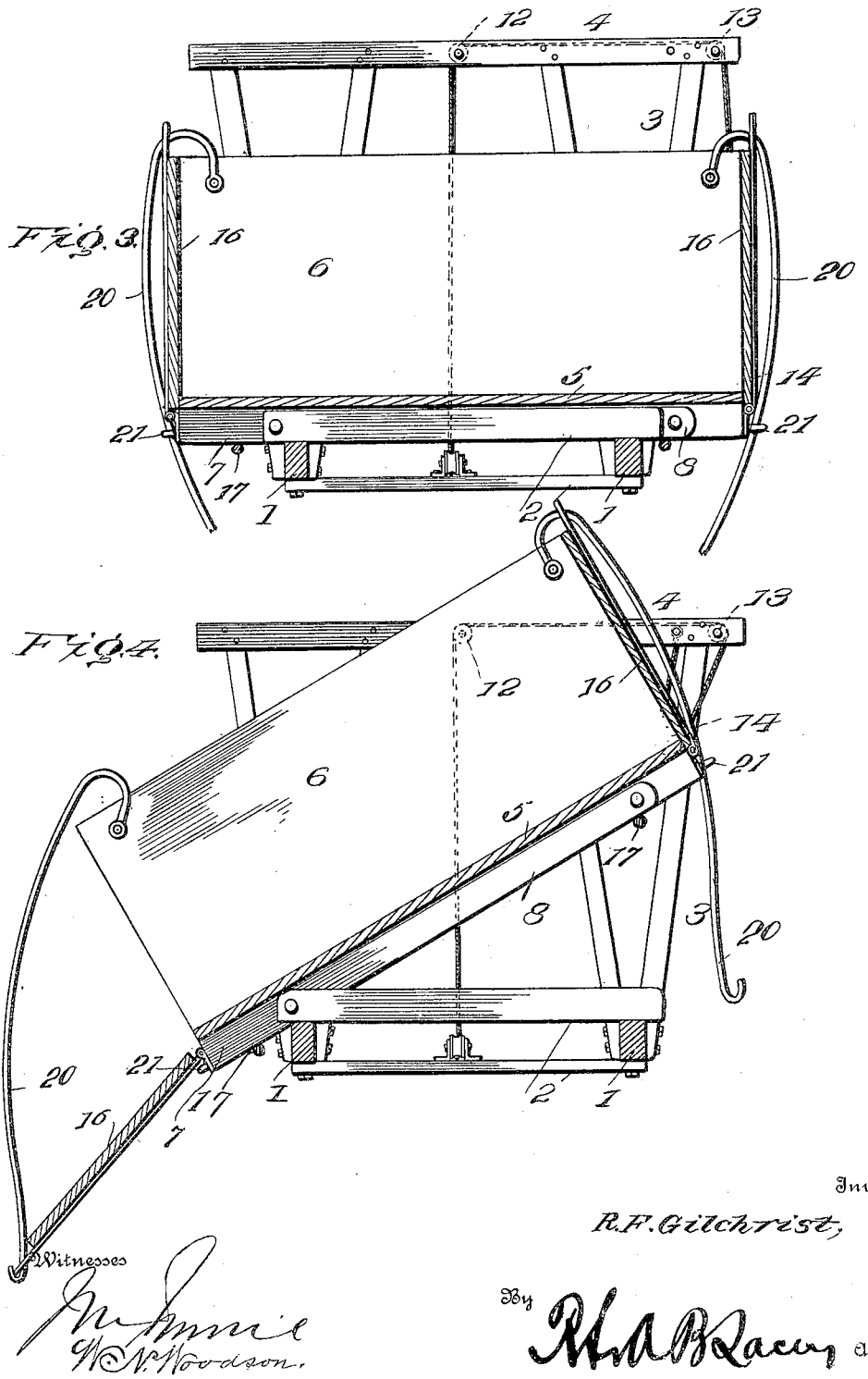

UNITED STATES PATENT OFFICE.

ROBERT F. GILCHRIST, OF LEWISVILLE, IDAHO.

BEET-RACK.

No. 822,360.   Specification of Letters Patent.   Patented June 5, 1906.

Application filed June 22, 1905. Serial No. 266,494.

*To all whom it may concern:*

Be it known that I, ROBERT F. GILCHRIST, a citizen of the United States, residing at Lewisville, in the county of Fremont and State of Idaho, have invented certain new and useful Improvements in Beet-Racks, of which the following is a specification.

This invention relates to improvements in beet-racks, and is designed more particularly for the handling of sugar-beets, and has for its object to produce a device of this character by the use of which a single man can dump a heavy load of beets with comparatively little exertion.

A further object is to construct a beet-rack which will be simple and durable in construction, simple in operation, and which can be manufactured at a comparatively small cost.

To this end it consists, essentially, of a rack pivotally mounted upon the bed of a wagon and a ratchet mechanism and a system of pulleys for dumping same.

For a full description of the invention and the merits thereof and also to acquire a knowledge of the details of construction of the means for effecting the result reference is to be had to the following description and accompanying drawings, in which—

Figure 1 is a perspective view of the device. Fig. 2 is a longitudinal sectional view showing the rack as seated upon the bed of the wagon. Fig. 3 is a transverse sectional view. Fig. 4 is a similar view showing the rack as tilted.

Corresponding and like parts are referred to in the following description and indicated in all the views of the drawings by the same reference characters.

The bed of the wagon consists of two longitudinal beams 1, connected by cross-bars 2. The ends of the wagon are formed by members 3, secured upon the opposite sides of the longitudinal beams 1 and flaring as they extend upwardly. The upper ends of the members 3 are connected by transverse strips 4, fastened upon opposite sides thereof so as to leave a space between them for the reception of pulleys. The lower ends of the members 3 are joined by reinforcing transverse members 15.

The rack itself comprises a bottom 5, ends 6, and sides 16, the bottom being reinforced by transverse bars 7 and by longitudinal truss-rods 17, which pass under the middle transverse bars 7 and are secured to the end transverse bars, so as to reinforce the rack and enable it to withstand the strain imposed upon it when in an elevated position. The sides 16 are secured to the bottom by means of strap-hinges 18, which are fastened to the transverse bars 7. The straps on the two end hinges extend upward slightly above the sides and are provided with slots 19, which coöperate with rods 20 to enable the sides to be locked in a closed position and to limit their pivotal motion. The rods 20 pass through the slots 19 and have each end curved or hooked, one of the ends being loosely connected to the ends 6, while the opposite ends are secured under hooks 21 to hold the sides closed. When the rods are released from under the hooks 21, the sides fly open until the hooks at the ends of the rods engage with the slots to prevent further movement. In order to close the sides, it is simply necessary to raise them into position and then secure the rods 20 under the hooks 21. The rack is pivotally connected to the wagon by means of links 8, which are pivoted at one end to the cross-bars 2 and at the opposite end to the transverse bars 7. The use of these links enables the rack to be dumped on either side of the wagon. A drum 9, operated by the ratchet mechanism 10, is mounted upon one end of the wagon and is connected with flexible members 11, which extend upward over pulleys 12, mounted at an intermediate point between the transverse strips 4, over pulleys 13, similarly mounted at one end of the strips 4, over pulleys 14, fastened to one side of the rack, and have their ends securely fastened to the upright members 3 near the pulleys 13. It will be readily seen that one of the flexible members must pass beneath the rack and through a pulley at the opposite end of the wagon before going upward over the pulley 12. Owing to the action of the double pulleys and the leverage obtained by the ratchet mechanism, one man will be able to dump a very heavy load. After the proper side has been opened the drum 9 is caused to turn by working the ratchet mechanism and the flexible members are wound in, so that one side of the rack is elevated and the contents thereof dumped.

Having thus described the invention, what is claimed as new is—

1. The combination of a wagon-body having a side member pivotally attached thereto and provided with openings in its upper portion, and locking members passing through the openings, one end of the locking members being loosely connected to the adjacent sides of the wagon-body while the opposite end is adapted to be secured to the wagon in order to lock the side in a closed position or to engage with the openings in the side to limit its pivotal motion.

2. In a device of the character described, the combination of a wagon-bed having an upwardly-extending framework at each end, a rack resting upon the bed and comprising a bottom, ends, and sides, said sides being pivotally connected to the bottom of the rack and being provided with openings in their upper portion through which locking members are passed, one end of the locking members being loosely attached to the ends of the rack while the opposite end is adapted to be secured to the rack in order to lock the sides in a closed position or to engage with the opening in the sides in order to limit their pivotal motion, and means for elevating one side of the rack so as to dump the contents thereof.

In testimony whereof I affix my signature in presence of two witnesses.

ROBERT F. GILCHRIST. [L. S.]

Witnesses:
  T. A. HOGGAN, Jr.,
  C. W. POOLE.